April 21, 1970 T. M. A. LIPS 3,507,437

TAPE GUIDE FOR A RECORDER/REPRODUCER

Filed Jan. 10, 1968 2 Sheets-Sheet 1

INVENTOR.
THEODOOR M.A.LIPS
BY
Frank R. Trifari
AGENT

INVENTOR.
THEODOOR M.A. LIPS
BY
Frank R. Jifani
AGENT

United States Patent Office 3,507,437

Patented Apr. 21, 1970

3,507,437

TAPE GUIDE FOR A RECORDER/REPRODUCER

Theodoor Maria Albert Lips, Emmasingel,
Eindhoven, Netherlands

Filed Jan. 10, 1968, Ser. No. 696,819
Claims priority, application Netherlands, Jan. 14, 1967, 6700632
Int. Cl. B65h *23/02*
U.S. Cl. 226—196 3 Claims

ABSTRACT OF THE DISCLOSURE

A tape guide for a recorder/reproducer. A guide member having a cylindrical guiding surface, is pivotally attached to a support on the face plate of the recorder/reproducer adjacent the recording/reproducing heads. The tape guide includes a rigid abutment surface adjacent the guiding member for limiting lateral movement of the tape. The guiding surface is capable of tilting in all directions in response to the forces applied thereto by the tape, but is restricted from rotating by a coupling between the guiding member and the abutment surface.

The invention relates to a device for guiding a tape-shaped record carrier in an apparatus for recording and/or reproducing magnetic recordings.

In a known tape guiding device, the lateral abutment faces which serve as a guide for the longitudinal edges of the tape are constituted by two terminal flanges on a hollow cylindrical roller. The roller which is therefore integral with the lateral abutment faces, is secured on a self-adjusting ballbearing so as to be both freely rotatable around the cylindrical axis and to be tiltable in the planes passing through the axis of the cylinder. In this known tape-guiding device, the tape will not remain at the level defined by the recording and playback heads of the apparatus because of the rotatability of the guide roller. This results in the tape being laterally misplaced with respect to the recording/reproducing heads so that, for example, either cross-talk or an incorrect recording of the signals on the tape may be produced. Moreover, the terminal flanges of the guiding roller, which are both tiltable and rotatable, adversely affect the travel of the tape in two material ways, first the tape is transported primarily by the rotating flanges and not the guiding surfaces, and secondly the flanges push the tape out of the plane of the recording or reproducing heads when the roller performs a tilting movement. Due to the forces imposed on the tape by the rotating and tilting of the roller tensile stress differences will be produced in the tape which result in non-uniform elongation of the tape. This non-uniform elongation, which primarily occurs in tapes in which the ratio between thickness and width is very small, results in unsatisfactory engagement between the heads and the tape during recording or playback so that the data thus obtained is either incorrect or destroyed.

According to the invention a device is provided which guides a record carrying tape adjacent the recording or playback heads without substantially changing the level of the plane of movement of the tape with respect to the recording or playback heads. The device includes a guiding member having at least a partial cylindrical outer surface for guiding one of the tape surfaces. The guide member is journalled on a support member for tilting or pivoting movement. An abutment face is located opposite an end face of the guiding member at a certain distance therefrom and occupies a fixed position with respect to the support. Coupling members are provided between the stationary abutment face and the guiding member which prevent rotation of the guiding member about the axis of the cylindrical guide surface but which permit tilting movement in arbitrary planes passing through the axis of the cylindrical guiding surface.

In the device according to the invention, the non-rotatable guiding member, which is tiltable independently of the stationary abutment face, will always be adjusted to such a state of equilibrium that the stresses are uniform throughout the tape, which the stationary abutment face ensures that the level of the plane travel of the tape is maintained.

The stationary lateral abutment face is provided opposite the end face of the guiding member and hence at a bending point of the tape. With tapes in which the ratio between thickness and width is small, the level of the tape can be successfully maintained only at the area of maximum rigidity of the tape.

The invention will be described in greater detail with reference to a preferred embodiment thereof illustrated in the accompanying drawing, in which.

Figure 1:
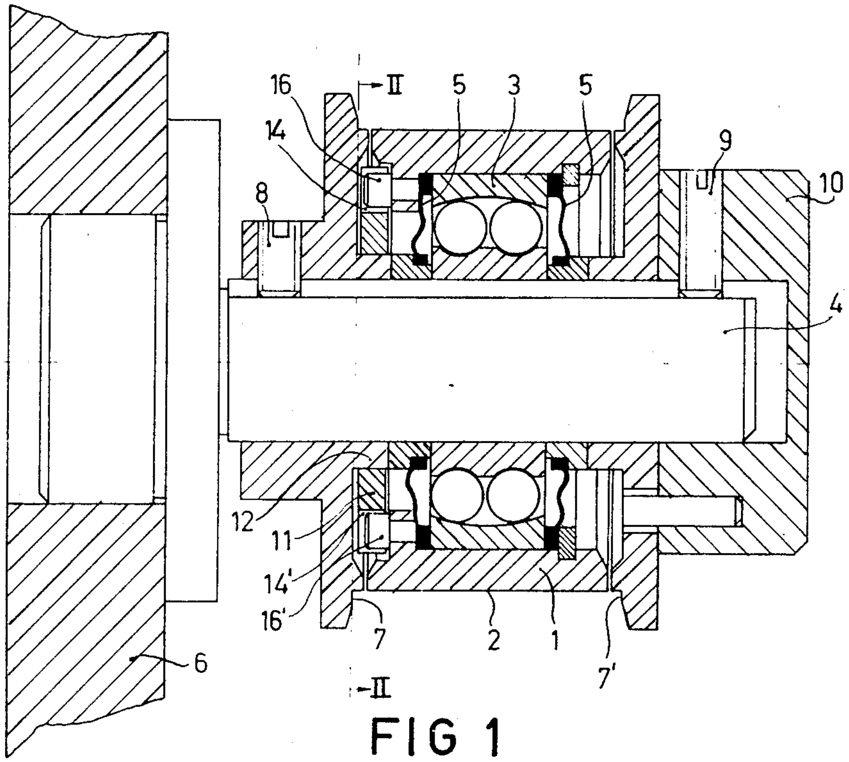
FIG. 1 is a longitudinal sectional view of a tape-guiding device according to the invention.
Figure 2:
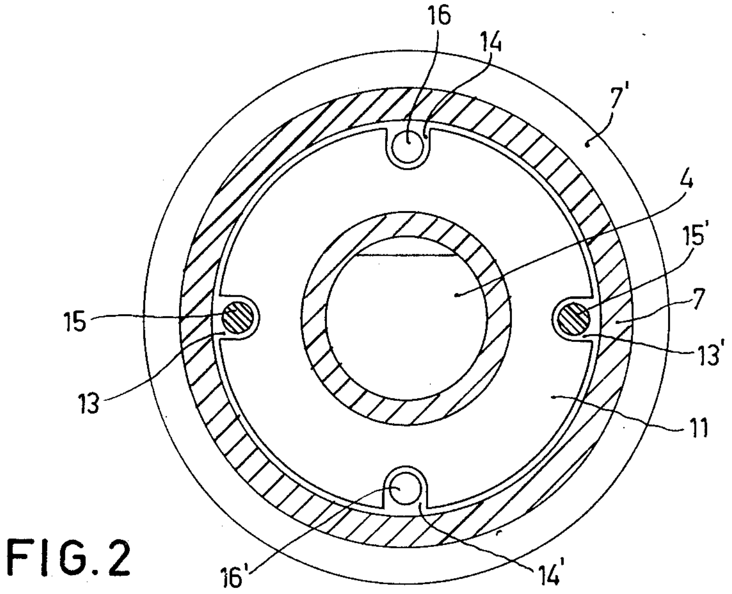
FIG. 2 is a cross-sectional view of this device taken on the line II—II of FIG. 1.

In the drawing, the device according to the invention has a guiding member 1 with at least a portion of the cylindrical outer surface 2 serving as a guide for one of the surfaces of a tape-shaped record carrier 30 in an apparatus for recording and/or playing back magnetic recordings. The guiding member 20 which in the instant embodiment has the form of a cylindrical guiding sleeve 1, mounted on a self-adjusting ballbearing 3, the latter of which engages a supporting pin 4. The ballbearing 3 is sealed in a dust-tight manner by means of sealing rings 5. The pin 4 is secured in the mounting plate 6 of the apparatus.

Flanges 7, 7′ are provided with abutment faces for the longitudinal edges of the tape to be guided and are located opposite the end faces of the guiding sleeve 1 for restricting lateral movement of the tape. The flanges 7, 7′ occupy a fixed position with respect to the mounting plate 6 and are therefore not rotatable. The flange 7 is secured by means of a set screw 8 on the supporting pin 4. Flange 7′ is clamped by a clamping sleeve 10, the latter of which is secured on the pin 4 by a set screw 9. A certain amount of clearance exists between the stationary flanges 7, 7′ and the end faces of the guiding sleeve 1 so that the sleeve 1 can perform limited tilting movements.

Between the flange 7 and the guiding sleeve 1 is disposed an annular disc 11 which is made, for example, of a resilient synthetic resin such as nlyon. The disc is loosely placed on a hub 12 of the flange 7. The annular disc 11 is provided with two pairs of diametrically opposite radial orthogonal slots 13, 13′ and 14, 14′, respectively. The flange 7 has two axially extending pins 15, 15′ which cooperate with one pair of slots 13, 13′ of the disc 11 and the guiding sleeve 1 has two axially extending pins 16, 16′ which cooperate with one pair of slots 14, 14′. The coupling established by the pins and the disc between the stationary flange 7 and the movable sleeve 1 prevents rotation of the sleeve 1 about its cylinder axis but permits the sleeve to tilt in any arbitary plane passing through the axis of the cylindrical guiding member 1. Hence, the coupling acts like a universal joint. It should be noted that the invention is not limited to the coupling constituted by the pins and the disc, but that it also applies to any other joint between flange and sleeve acting like a universal joint.

Figure 3:
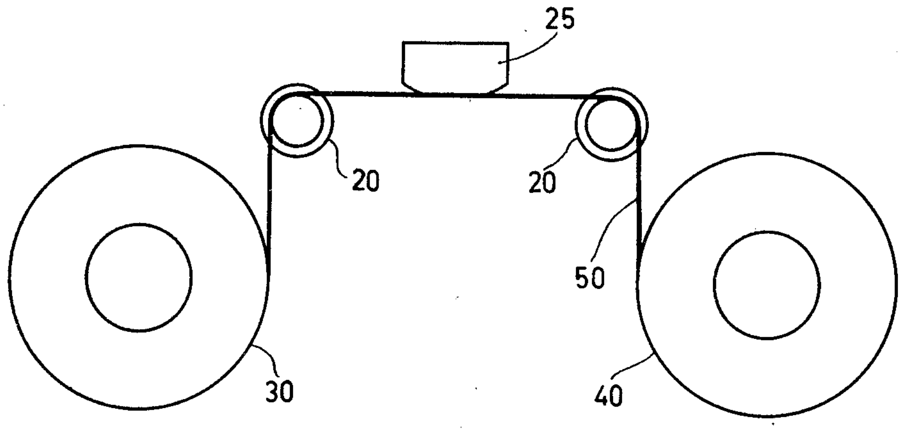
FIG. 3 shows the guiding device positioned relative to the recording/reproducing heads.

In FIG. 3 a pair of tape guiding members 20 are shown aligning the recording tape 30 with respect to a recording/reproducing head 25. The tape 50 emanates from a spool 30 and is received by a second spool 40 in a conventional manner.

The above cited embodiments are intended as exemplary only, and while I have described by invention with a specific application and embodiment thereof, other modifications will be apparent to those skilled in the art without departing from the spirit and scope of the invention.

What is claimed is:

1. A tape guide for a recorder/reproducer apparatus comprising a mounting plate, a support attached to said mounting plate, a guiding member having at least a partial cylindrical outer surface for guiding a tape, bearing means interconnecting said support and said guiding member for moving said guide member in all directions in response to forces applied thereto by said tape; flange means coupled to said support in spaced relationship along the axis of said cylindrical surface with respect to said guiding member for limiting lateral movement of said tape; an inner disc of resilient material interposed between said flange means and said guiding member, at least one axially extending pin interconnecting said flange means and said disc and at least one axially extending pin interconnecting said guiding member and said disc, wherein said pin interconnections permit tilting movement of said guiding member with respect to said flange means and preclude rotation therebetween.

2. A tape guide according to claim 1 wherein the guiding member is a cylindrical sleeve and said bearing means comprises ballbearings interposed between the support and the guiding member.

3. A tape guide according to claim 2 wherein the inner disc is made of synthetic resin and defines in its outer periphery at least two pairs of diametrically opposite radial orthogonal slots for accommodating the axially extending pins.

References Cited

UNITED STATES PATENTS

| | | | |
|---|---|---|---|
| 3,140,033 | 7/1964 | Zivny | 226—196 |
| 3,342,389 | 9/1967 | Drexler | 226—194 X |

RICHARD A. SCHACHER, Primary Examiner

U.S. Cl. X.R.

226—192

PO-1050
(5/69)

UNITED STATES PATENT OFFICE
CERTIFICATE OF CORRECTION

Patent No. 3,507,437 Dated April 21, 1970

Inventor(s) THEODOOR MARIA ALBERT LIPS

It is certified that error appears in the above-identified patent and that said Letters Patent are hereby corrected as shown below:

In the Title - insert -

--by mesne assignments, to U. S. Philips Corp.--

Col. 3, line 4 "by" should be --my--

Signed and Sealed this 28th day of November 1972.

(SEAL)
Attest:

EDWARD M.FLETCHER,JR.
Attesting Officer

ROBERT GOTTSCHALK
Commissioner of Patents